United States Patent
Ehrlichman et al.

(10) Patent No.: US 12,429,326 B2
(45) Date of Patent: Sep. 30, 2025

(54) ON-CHIP OPTO-DIGITAL WAVELENGTH METER

(71) Applicant: Axalume, Inc., Cayenne Creek Rd., CA (US)

(72) Inventors: Yossef Ehrlichman, San Diego, CA (US); Vinod Krishnamoorthy, San Diego, CA (US); Ashok V. Krishnamoorthy, San Diego, CA (US)

(73) Assignee: Axalume, Inc., San Diego, CA (US)

( * ) Notice: Subject to any disclaimer, the term of this patent is extended or adjusted under 35 U.S.C. 154(b) by 260 days.

(21) Appl. No.: 18/071,652

(22) Filed: Nov. 30, 2022

(65) Prior Publication Data

US 2024/0175672 A1 May 30, 2024

(51) Int. Cl.
- *G01B 9/02* (2022.01)
- *G01B 9/02004* (2022.01)
- *G01B 9/02015* (2022.01)

(52) U.S. Cl.
CPC ..... *G01B 9/02051* (2013.01); *G01B 9/02004* (2013.01); *G01B 9/02027* (2013.01); *G01B 9/02083* (2013.01)

(58) Field of Classification Search
CPC ............ G01B 9/02051; G01B 9/02027; G01B 9/02004; G01B 9/02083; G01J 9/0246
See application file for complete search history.

(56) References Cited

U.S. PATENT DOCUMENTS

| | | | |
|---|---|---|---|
| 6,661,361 B1 * | 12/2003 | Lewis | G02F 7/00 341/137 |
| 10,578,494 B1 * | 3/2020 | Tiemann | G01J 9/02 |
| 2003/0031404 A1 * | 2/2003 | Pedersen | G02B 6/29353 385/24 |
| 2011/0149292 A1 * | 6/2011 | Himmelhaus | G01N 21/7746 356/454 |
| 2017/0074640 A1 * | 3/2017 | Cable | G01B 9/02004 |
| 2021/0175689 A1 * | 6/2021 | Eggleston | H01S 5/4062 |
| 2022/0365400 A1 * | 11/2022 | Zeiler | G02F 1/212 |
| 2023/0414103 A1 * | 12/2023 | Allen | G01B 9/02051 |

* cited by examiner

*Primary Examiner* — Tarifur R Chowdhury
*Assistant Examiner* — Carlos Perez-Guzman
(74) *Attorney, Agent, or Firm* — Steven Stupp

(57) ABSTRACT

An integrated circuit that includes a wavelength meter is described. This integrated circuit may include: a set of interferometers having integer multiples of a phase or a delay, where the set of interferometers provide outputs corresponding to a range from an MSB to an LSB of a wavelength in an optical signal. For example, the set of interferometers may include MZIs or ring resonators. Moreover, the integrated circuit may include a converter that provides digital electrical signals that specify the range from the MSB to the LSB. Note that the set of interferometers may have different FSRs, where an interferometer that provides an output corresponding to the MSB has a largest FSR and a smallest phase or delay, and a second interferometer that provides a second output corresponding to the LSB has a smallest FSR and a largest phase or delay.

21 Claims, 13 Drawing Sheets

ON-CHIP OPTO-DIGITAL WAVELENGTH METER

STATEMENT REGARDING FEDERALLY SPONSORED RESEARCH OR DEVELOPMENT

This invention was made with government support under Grant/Contract No. 1927082 awarded by the National Science Foundation. The government has certain rights in the invention.

FIELD

The present disclosure relates to techniques for measuring predefined wavelengths in an optical signal. More specifically, the present disclosure relates to a digital wavelength meter for measuring predefined wavelengths in an optical signal.

BACKGROUND

Wavelength meters (or wavemeters) are instruments that can be used to measure high-accuracy wavelength values in optical signals, such as pulsed or continuous-wave laser sources. Wavelength meters often provide high-accuracy monitoring of tunable lasers and diode lasers. Moreover, wavelength meters are typically used to measure dense wavelength-division multiplexing (DWDM) signals or to calibrate fixed-wavelength or tunable transmitter lasers, and usually provide high resolution, high accuracy, and a high repetition rate.

Existing wavelength meters often measure a wavelength using interferometry. For example, light from a single light source may be split into two (or more) beams that travel in different optical paths, which are then combined again. The resulting interference may provide information about the wavelength of the light source. Note that existing wavelength meters typically are based on bulk or free-space optics.

Two common types of existing wavelength meters are based on Michelson interferometer and Fizeau Interferometer. (However, some existing wavelength meters may be based on other types of interferometers, such as a Fabry-Perot interferometer.) In a scanning Michelson interferometer, light from an optical source under test may be measured while a length of one of interferometer arms is scanned through a certain range. The wavelength of the light source may be derived from a period of the output power recorded by a photodetector with respect to the arm-length changes. Note that this technique typically uses a microprocessor to control the measurement process and to analyze the data.

Alternatively, a Fizeau interferometer may use two planar reflecting surfaces with a slight deviation from exact parallelity. These surfaces may superimpose two copies of an input beam with a slight relative angle, leading to an interference pattern. Based on a period of the pattern, the wavelength can be derived.

Furthermore, another approach to measuring a wavelength (e.g., in a visible band of frequencies) uses color sensor chips. A color sensor chip may include an array of photodiodes with different absorptive color filters. By comparing the relative amplitudes of light on the photodiodes, the wavelength of light can be determined. In addition to absorption in the filters, note that etalon effects may add additional spectral features that improve the precision of these existing wavelength meters. Next, the output of the photodiodes may be digitized using an analog-to-digital converter and processed with a microcontroller.

Additionally, wavelengths can also be measured using an optical spectrometer. The purpose of an optical spectrometer is to measure an entire frequency range (or wavelength spectrum) and to provide the relative powers of the different spectral components. However, an optical spectrometer typically involves complicated data processing. Consequently, a wavelength meter is usually more precise than an optical spectrometer.

Recent technological advances have enabled integrated tunable lasers, such as on-chip lasers. In order to tune and control these lasers accurately and to provide feedback to the laser drive circuitry, on-chip integrated wavelength meters are needed. Note that chip-scale integration can improve stability and can provide reduced cost, size, and weight. However, because of multiple bulky components and complicated signal processing, it typically difficult to implement and calibrate an accurate on-chip wavelength meter.

SUMMARY

An integrated circuit that includes a wavelength meter is described. This integrated circuit includes: a set of interferometers having integer multiples of a phase or a delay, where the set of interferometers provide outputs corresponding to a range from a most-significant bit (MSB) to a least-significant bit (LSB) of a wavelength in an optical signal. Moreover, the integrated circuit includes a converter, optically coupled to the set of interferometers, that provides digital electrical signals that specify the range from the MSB to the LSB.

Moreover, the set of interferometers may include Mach Zehnder interferometers (MZIs) or ring resonators.

Furthermore, the set of interferometers may provide the outputs using a parallel implementation of binary quantization (which quantizes the input wavelength).

Additionally, the converter may include: one or more photodetectors, optically coupled to the set of interferometers, that provide analog electrical signals corresponding to the outputs; and one or more comparators (or one or more amplifiers), electrically coupled to the one or more photodetectors, that provide the digital electrical signals corresponding to the analog electrical signals (and the wavelength in the optical signal).

In some embodiments, the set of interferometers may have different free spectral ranges (FSRs), where an interferometer in the set of interferometers that provides an output corresponding to the MSB has a largest FSR and a smallest phase or delay, and a second interferometer in the set of interferometers that provides a second output corresponding to the LSB has a smallest FSR and a largest phase or delay. A range of the wavelength meter may be specified by the largest FSR and a precision of the wavelength meter may be specified by the smallest FSR.

Note that an interferometer in the set of interferometers may have a periodic spectrum having a period, and the period may be an even integer multiple of a second period of a second interferometer in the set of interferometers.

Moreover, the integrated circuit may include an optical splitter, optically coupled to the set of interferometers, that provides portions of the optical signal to the set of interferometers.

Furthermore, the set of interferometers may include one or more ring resonators, such as a pair of ring resonators. In some embodiments, a given ring resonator provides a phase or a delay.

Additionally, the set of interferometers may include an MZI having the phase or the delay in an arm of the MZI.

Another embodiment provides an electronic device or a system that includes the integrated circuit.

Another embodiment provides a method for providing digital electrical signals that specify a range from a most-significant bit (MSB) to a least-significant bit (LSB) of a wavelength in an optical signal, which may be performed by the integrated circuit.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
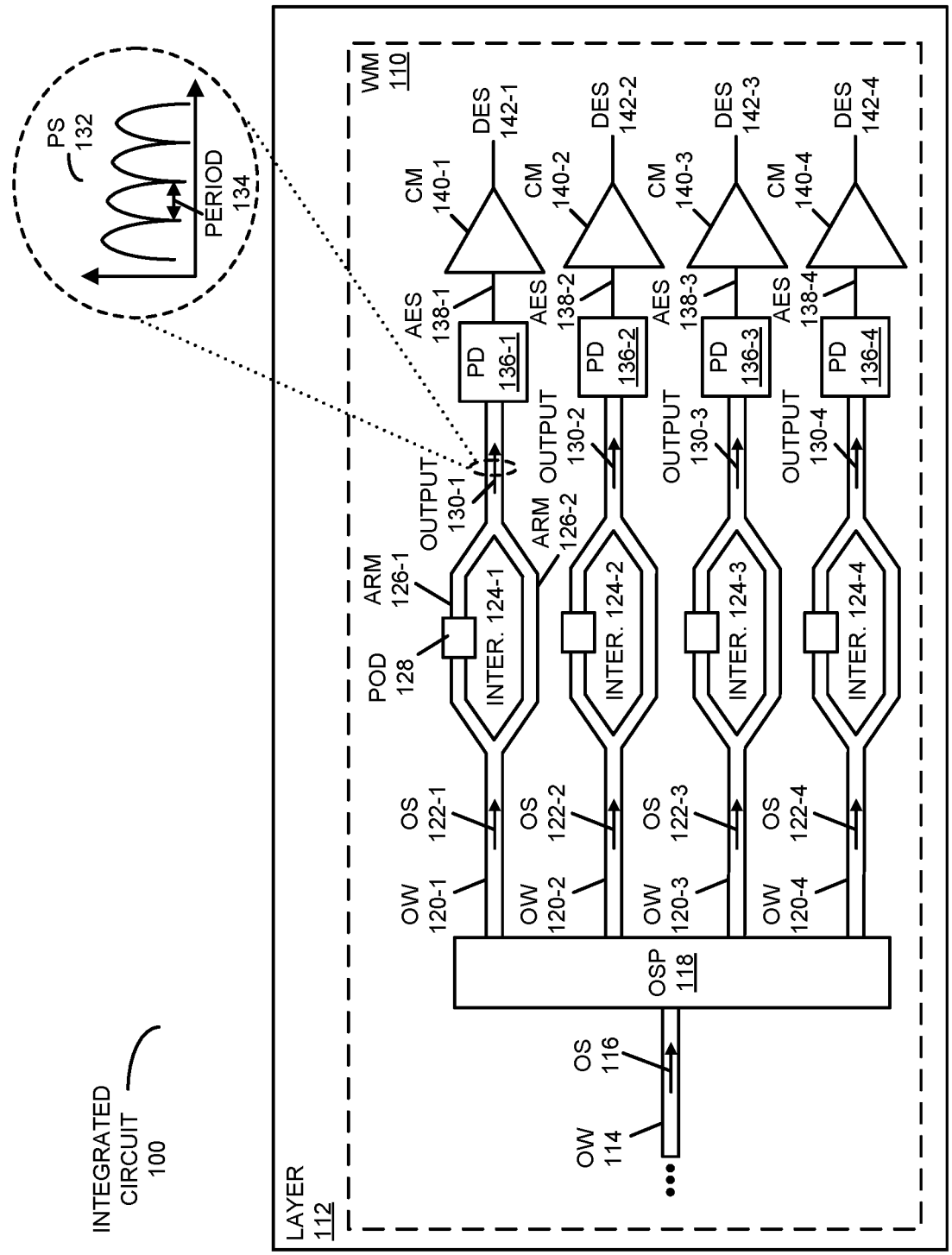
FIG. 1 is a block diagram illustrating an example of a top view of an integrated circuit that includes a wavelength meter in accordance with an embodiment of the present disclosure.

An integrated circuit that includes a wavelength meter is described. This integrated circuit may include: a set of interferometers having integer multiples of a phase or a delay, where the set of interferometers provide outputs corresponding to a range from an MSB to an LSB of a wavelength in an optical signal. For example, the set of interferometers may include MZIs or ring resonators. Moreover, the integrated circuit may include a converter that provides digital electrical signals that specify the range from the MSB to the LSB. Note that the set of interferometers may have different FSRs, where an interferometer that provides an output corresponding to the MSB has a largest FSR and a smallest phase or delay, and a second interferometer that provides a second output corresponding to the LSB has a smallest FSR and a largest phase or delay. A range of the wavelength meter may be specified by the largest FSR and a precision of the wavelength meter may be specified by the smallest FSR.

By providing the outputs, the measurement techniques may provide an accurate on-chip wavelength meter. Moreover, the wavelength meter may be easier to implement (e.g., it may have fewer bulky or complicated components) and calibrate. For example, the wavelength meter may remove the need for complicated electronic analog-to-digital circuits and signal processing in order to extract the wavelength. Instead, the wavelength meter may be an optical-to-digital electrical signal wavelength meter that converts readings from the photodiodes directly to the digital electrical signals, thereby making analog-to-digital converts and signal processing unnecessary. These capabilities may allow the wavelength meter to operate at high speed, which may facilitate the control of the wavelength of internally modulated lasers having a high-speed modulated cavity (such as ring modulated lasers or RMLs, or reflective semiconductor optical amplifiers or RSOAs). Furthermore, the wavelength meter may convey light in the integrated circuit via a single-mode optical waveguide, which may be more immune to changes or flaws in the beam profile compared to a free-space/bulk wavelength meter or multimode wavelength meters. Additionally, the accuracy of the measured wavelength may be exponentially improved by adding an additional interferometer to the set of interferometers (which may improve the wavelength accuracy by a factor of two).

Therefore, the measurement techniques may be useful in a variety of applications, such as: communications, health monitoring, compact spectroscopy and/or chemical identification.

We now describe embodiments of the integrated circuit. One approach for implementing an on-chip wavelength meter is to use an unbalanced MZI with two output ports. The unbalanced MZI may have a fixed path difference delay (which is sometimes referred to as a 'delay' or a 'phase') between the two arms, so that the output power is dependent on the input wavelength. Based on the power ratio between the two ports, the wavelength can be derived. However, the response of a two-port MZI has local maxima and minima at constructive and destructive interference, respectively. Once the MZI has reached one of these two conditions, the sign of the change in wavelength is not known as the MZI output changes. Moreover, the derivative of the outputs becomes small near the extreme operating points, which reduces the wavelength-meter accuracy.

A solution to this problem is to use a three-port MZI. A three-port MZI has outputs with a mutual phase difference of 120°. When one of the outputs has reached a local maximum or minimum, the change in wavelength or displacement can still be obtained from the other two outputs.

Other solutions include the use of coherent detection techniques to increase wavelength reading accuracy and to provide improved robustness to temperature changes. In these approaches, the phase may be measured using 90° optical hybrid multi-mode interference (MMI) device, in which scaling of the phase with the FSR allows the wavelength to be determined. However, imperfections of the 90° optical hybrid MMI device can lead to distortions that is visible in the sinusoidal likely response and to imbalance at photodiodes in one or more photodetectors that measure one or more analog electrical signals, which may induce errors in the measurement of the wavelength. Notably, the photodetector photocurrent uncertainty is often limited by analog-to-digital converter (ADC) resolution (assuming that the range of the ADC encompasses the analog electrical signal). Consequently, the accuracy of the measured phase and, thus, the measured wavelength is often limited by the effective number of bits of the ADCs. Moreover, extraction of the phase typically requires some computation effort from an in-phase/90° phase-offset or IQ signal representation, which can further reduce the wavelength measurement accuracy.

Note that there two classes of fabrication platforms: a CMOS platform (such as silicon-on-insulator or SOI platforms) that can support homogenous integration with electronics; and other platforms, some of which low-loss (such as silicon nitride, glass, etc.), that do not support homogenous integration. In principle, the wavelength accuracy can be improved by using low-loss fabrication platforms to implement an unbalanced MZI with long delay lines. However, many low-loss fabrication platforms (such as silicon nitride or glass) usually do not support homogeneous integration of photodetectors or electronic components on-chip. Instead, they typically require the use of external photodetectors and electronic reading circuits. Consequently, when the low-loss fabrication platform is used in conjunction with another platform that supports homogeneous integration with electronic components (such as advanced-node SOI platforms), the additional electronic circuits (e.g., ADCs and a processing or control unit) is often complicated.

Furthermore, an on-chip wavelength meter may be implemented using an array waveguide gratings (AWG) filter with an integrated photodiode array. The AWG responses may be designed to obtain large nearest neighbor crosstalk (or large overlap) between output channels, which may allow accurate measurement of the wavelength of a laser under test using a centroid detection technique. However, because of phase errors in fabrication, especially for high-index-of-refraction-contrast optical waveguide structures such as SOI, it is typically difficult to calibrate the AWG in and to maintain its calibration during operation of an on-chip wavelength meter.

In the disclosed measurement techniques, these problems are addressed using an on-chip wavelength meter that includes a set of interferometers. This is shown in FIG. 1, which presents a block diagram illustrating an example of a top view of an integrated circuit 100 that includes a wavelength meter (WM) 110. This integrated circuit includes an optical waveguide 114 that is defined, at least in part, in a layer 112 (which is described further below with reference to FIG. 2). During operation of integrated circuit 100, optical waveguide (OW) 114 may convey an optical signal (OS) 116, such as from left to right in FIG. 1.

Moreover, wavelength meter 110 may include an optical splitter (OSP) 118 that splits optical signal 116 into optical signals 120 that are provided via optical waveguides 122 to a set of interferometers 124 having integer multiples of a phase or a delay, such as a predefined phase or delay. For example, a given interferometer (such as interferometer 124-1) in the set of interferometers 124 may include an unbalanced MZI having a single output port. Notably, interferometer 124-1 may include two arms 126 that convey portions of one of optical signals 120, and arm 126-1 may include a phase offset device (POD) 128 that provides a given phase or the delay (such as one of the integer multiples of the phase or the delay) between portions of the one of optical signals 120 in arms 126. For example, the phase offset device 128 may include a passive device, such as doped region having a different index of refraction or a region that includes a different material than layer 112. Alternatively, phase-offset device 128 may be an active device, such as a tuned phase shifter. For example, the phase offset may be thermally tuned, e.g., using a micro-heater. In some embodiments, a heater (such as nickel chromium) may be implemented by adding doping regions thermally proximate to arm 126-1, but with a dielectric layer between the heater and an optical waveguide in arm 126-1 to prevent optical absorption by metal.

Furthermore, the set of interferometers 124 may provide outputs 130 corresponding to a range from an MSB to an LSB of a wavelength in optical signal 116. For example, an output 130-1 from interferometer 124-1 may include a periodic spectrum (PS) 132 having a period 134 (which specifies a FSR of interferometer 124-1). (As described further below, note that period 134 encodes the input wavelength. For an input wavelength that induces a large signal, the output from one or more comparators 140 is high. Alternatively, for an input wavelength that induces a low signal, the output from the one or more comparators 140 is low. By using a set of interferometers 124 having different periods, the input wavelength may be determined from the sequence of highs and lows in the outputs from the one or more comparators 140.)

Additionally, integrated circuit 100 may include a converter, optically coupled to the set of interferometers 124, that provides digital electrical signals (DES) 142 that specify the range from the MSB to the LSB. For example, the converter may include: one or more photodetectors (PD) 136, optically coupled to the set of interferometers 124, that provide analog electrical signals (AES) 138 corresponding to outputs 130; one or more optional amplifiers (such as transimpedance amplifiers, which are not shown), electrically coupled to the one or more photodetectors 136, that amplify the analog electrical signals 138; and one or more comparators (CM) 140, electrically coupled to the one or more optional amplifiers, that provide the digital electrical signals 142 corresponding to the analog electrical signals 138 (and the wavelength in optical signal 116).

In some embodiments, the set of interferometers 124 may provide outputs 130 using a parallel implementation of binary quantization (which quantizes the input wavelength). Notably, the set of interferometers 124 may have different FSRs, where interferometer 124-1 in the set of interferometers 124 that provides output 130-1 corresponding to the MSB has a largest FSR and a smallest phase or delay, and interferometer 124-4 in the set of interferometers 124 that provides output 130-4 corresponding to the LSB has a smallest FSR and a largest phase or delay. (While FIG. 1 illustrates wavelength meter 110 with four interferometers 124, in other embodiments there may be fewer or more interferometers. Note that the resolution or the measured wavelength accuracy may be set, at least in part, by the number of interferometers 124.) Moreover, periods of adjacent interferometers in the set of interferometers 124 may be related by an integer multiple (of divisor). For example, the period of interferometer 124-2 may be one-half of the period of interferometer 124-1, the period of interferometer 124-3 may be one-half of the period of interferometer 124-2, etc. Note that a range of wavelength meter 110 may be specified by the largest FSR and a precision of wavelength meter 110 may be specified by the smallest FSR.

Figure 2:
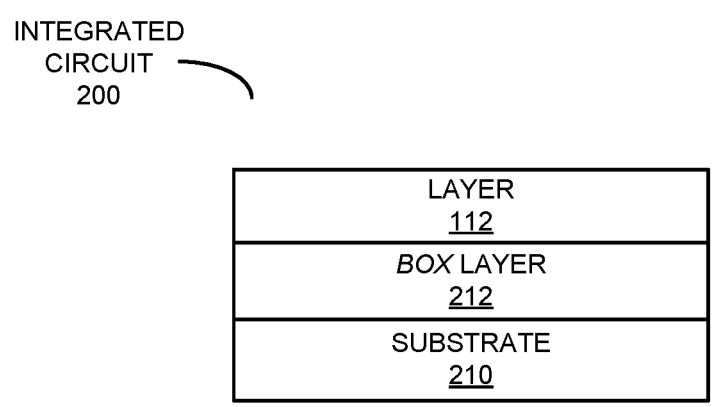
FIG. 2 is a block diagram illustrating an example of a side view of an integrated circuit in accordance with an embodiment of the present disclosure.

Integrated circuit 100 may be implemented using a SOI technology or platform. This is shown in FIG. 2, which presents a block diagram illustrating an example of a side view of an integrated circuit 200. This integrated circuit may include a substrate 210 and a buried-oxide (BOX) layer 212 disposed on substrate 210. Moreover, layer 112 may include a semiconductor layer disposed on BOX layer 212, where the semiconductor layer, at least in part, includes the optical waveguide 114 in FIG. 1. Thus, substrate 210 may include silicon, BOX layer 212 may include silicon dioxide and the semiconductor layer may include silicon. In some embodiments, there may be an oxide layer on top of layer 112.

However, a wide variety of materials may be used to implement integrated circuit 100 and optical waveguide 114 in FIG. 1, including: SOI, a semiconductor (e.g., indium phosphide, aluminum gallium arsenide, aluminum gallium nitride arsenide, aluminum gallium arsenide phosphide, a III-V compound semiconductor, etc.), and/or an insulator optical waveguide (e.g., silicon dioxide or silicon nitride). For example, integrated circuit 100 (FIG. 1) may include a substrate that is an insulator. Consequently, layer 112 may include: silicon, silicon dioxide, and/or silicon nitride. Therefore, integrated circuit 100 (FIG. 1) may be implemented using a variety of integrated optical waveguide technologies.

In general, wavelength meter 110 may be a spectrally broadband. In some embodiments, the fundamental or carrier wavelength of optical signal 116 in optical waveguide 114 in FIG. 1 is, e.g., between 1260-1360 nm or 1500-1600 nm. For example, optical signal 116 may have a fundamental or a carrier wavelength of 1.3 or 1.55 µm. Moreover, layer 112 may have a thickness that is, e.g., less than 1 µm (such as 0.2-0.5 µm). Furthermore, layer 112 may have a thickness, e.g., of 0.3 µm. Additionally, BOX layer 212 may have a thickness, e.g., between 0.3 and 3 µm (such as 0.8 µm).

Note that optical waveguide 114 in FIG. 1 may include a ridge optical waveguide or a channel optical waveguide. Moreover, optical waveguide 114 may be a single-mode optical waveguide. For example, optical waveguide 114 may have a width of 500 nm.

Referring back to FIG. 1, in some embodiments wavelength meter 110 may implement a 4-bit opto-digital wavelength meter. Optical signal 116, which is an input to wavelength meter 110, may include light with a wavelength λ and power $P_{in}$. The light may enter 1-to-4 optical splitter 118 and may be split into four branches. Each branch may include an unbalanced MZI in the set of interferometers 124. In an unbalanced MZI, one arm has a different phase or delay than the other (e.g., one arm may be longer than the other). The output of a given MZI (such as interferometers 124-1) may be coupled to a photodetector (such as photodetector 136-1) followed by a transimpedance amplifier and a comparator (such as comparator 140-1). The comparator may output a digital high value (such as '1') when the optical power at the of output of the MZI exceeds a threshold, and otherwise may output a digital low value (such as '0'). The array output from comparators 140, {D1, D2, D3, D4}, may be the digital representation of the input wavelength λ.

Wavelength meter 110 may return a wavelength reading in the spectral range between $\lambda_1$ to $\lambda_2$. This spectral range, between $\lambda_1$ to $\lambda_2$, may be defined as full scale (FS). Note that the number of MZIs can be between 1 to N. The resolution of wavelength meter 110 may be the minimum resolvable wavelength, and it is defined as $FS/2^N$ or $FS/(2^{N-1})$. Larger number of MZIs may increase the resolution, meaning, a smaller resolvable wavelength is possible.

In some embodiments, the MZIs in wavelength meter 110 may be unbalanced. For example, one of the arms may be longer than the other arm by length Ln. The optical delay caused by the path difference of the two arms may result in a sinewave dependance with the wavelength. For wavelengths at which the optical delay induces an integer multiple of a π phase shift between the two arms, a maximum power may be measured. Alternatively, for wavelengths at which the path difference induces an integer multiple of π/2, a minimum power may occur at the output of the MZI.

Moreover, for a given spectral range, $\lambda_1$ to $\lambda_2$, the number of sinewave cycles may depend on the path differences. Notably, shorter path differences may result in a smaller number of cycles and longer path differences may result in a larger number of cycles, which means that more wavelength in the given range may be integer multiples of π or π/2.

The MZI with shortest delay may represent the MSB. In FIG. 1, interferometer 124-1 may provide the MSB and may have the shortest delay ($L_1$) and the smallest number of transition points (SP) across the FS range. Note that the transition level may be the average between the maximum power and minimum power across the FS range.

Figure 3:
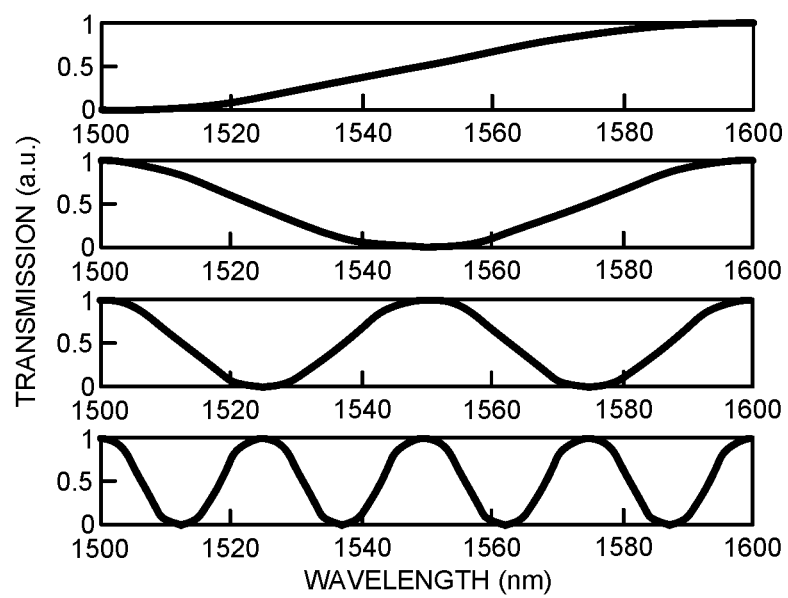
FIG. 3 is a drawing illustrating an example of variation of optical intensity with wavelength for a set of interferometers in the wavelength meter in FIG. 1 in accordance with an embodiment of the present disclosure.

FIG. 3 presents a drawing illustrating an example of variation of optical intensity (such as the power transmission) with wavelength for a set of interferometers 124 (such as the MZIs) in wavelength meter 110 (FIG. 1). Note that a given MZI may have the transmission function $$P_n = P_{in} \cdot \cos^2\left(\frac{\pi}{\lambda} \cdot n_{\textit{eff}}(\lambda) \cdot L_n\right),$$

where $P_{in}$ is the input power, $P_n$ is the output power, neff is the effective index of refraction of the optical waveguide and $L_n$ is the delay.

For example, in order to measure across 100 nm around a λ of 1550 nm, the delay $L_n$ may be $$P_n = \lambda_s\left(\frac{\pi}{4}\right) \cdot m/(2\pi n_{\textit{eff}}/\lambda_s - 0$$

where $\lambda_o$ is the center wavelength (1550 nm in this example) and m is an integer.

Moreover, in order to measure across 100 nm, the FSR of the MSB MZI (interferometer 124-1) may be 200 nm. In general, the FSR may be around twice the required FS. The FSR is given by $$FSR \approx \frac{\lambda_0^2}{n_g L},$$

where $n_g$ is the group index of refraction.

In some embodiments, the design process may include: calculate the lengths $L_i$ for different integer values of m; choose a value of $L_1$ that corresponds to the $FSR_1$ equal to twice the FS; and find the delay for the rest of the MZIs as $L_n$ equal to $L_{n-1} \cdot 2$. Based at least in part on this last operation, the FSR of $MZI_n$ may be $2^n \cdot FSR_1$ and the number of transition points may be $TP_n$ equal to $2^n$. The corresponding comparator threshold level may be at the transition point level. Moreover, the second MZI ($MZI_2$) may have twice as long of a delay, or $L_2$ equal to $2 \cdot L_1$ and twice the number of transition points across the FS, or $SP_2$ equal to $2 \cdot SP_1$. Furthermore, $MZI_n$ may have a $2^n$ times larger delay that $MZI_1$, or $L_n$ equal to $2^n \cdot L_1$ and $2^n$ more transition points across the FS, or $SP_n$ equal to $2^n \cdot SP_1$.

Figure 4:
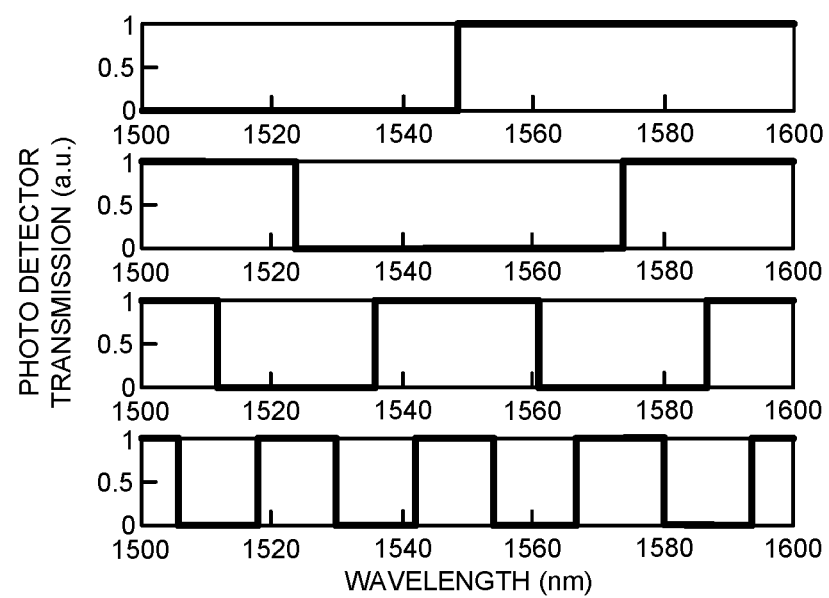
FIG. 4 is a drawing illustrating an example of digital electrical signals output by comparators in the wavelength meter in FIG. 1 in accordance with an embodiment of the present disclosure.

Thus, the delay length of the $MZI_1$ may be $L_1$. The delay length of $MZI_2$, $MZI_3$ and $MZI_4$ may be $L_2$ equal to $2 \cdot L_1$, $L_3$ equal to $2^2 \cdot L_1$ and La equal to $2^3 \cdot L_1$. For example, the delay length in $MZI_1$ may be 4.01 nm, the delay in $MZI_2$ may be 8.03 nm, the delay in $MZI_3$ may be 16.06 nm and the delay in $MZI_4$ may be 32.11 nm. Table 1 illustrates delay lengths and FSR for different MZIs. In general, the resolution of an MZI may decrease monotonically as a function of the arm length. Moreover, the center wavelength of an MZI may increase monotonically as a function of the arm length, and the FSR of an MZI may decrease monotonically as a function of the arm length. Note that each of the MZIs may exhibit a periodic transmission response with SPn transitions around the threshold level (e.g., SP1 equal to 2, $SP_2$ equal to four, etc.). In FIG. 3, after calibrating out the power at 1550 nm, the threshold level may be 0.5 for all of the MZIs. FIG. 4 presents a drawing illustrating an example of digital electrical signals 142 output by comparators 140 in wavelength meter 110 (FIG. 1).

TABLE 1

| Design | ΔL (μm) | FSR (nm) |
|---|---|---|
| 1 | 5.89 | 102.65 |
| 2 | 11.45 | 49.86 |
| 3 | 22.89 | 24.93 |
| 4 | 45.78 | 12.47 |
| 5 | 91.23 | 6.25 |
| 6 | 182.47 | 3.13 |
| 7 | 365.26 | 1.56 |
| 8 | 730.53 | 0.78 |
| 9 | 1461.05 | 0.39 |

Another embodiment with a longer delay may be implemented for MZIs having the transmission function $$P_n = P_{in} \cdot \cos^2\left(\frac{\pi}{\lambda} \cdot n_{eff}(\lambda) \cdot L_n + \frac{\pi}{4}\right).$$

Figure 5:
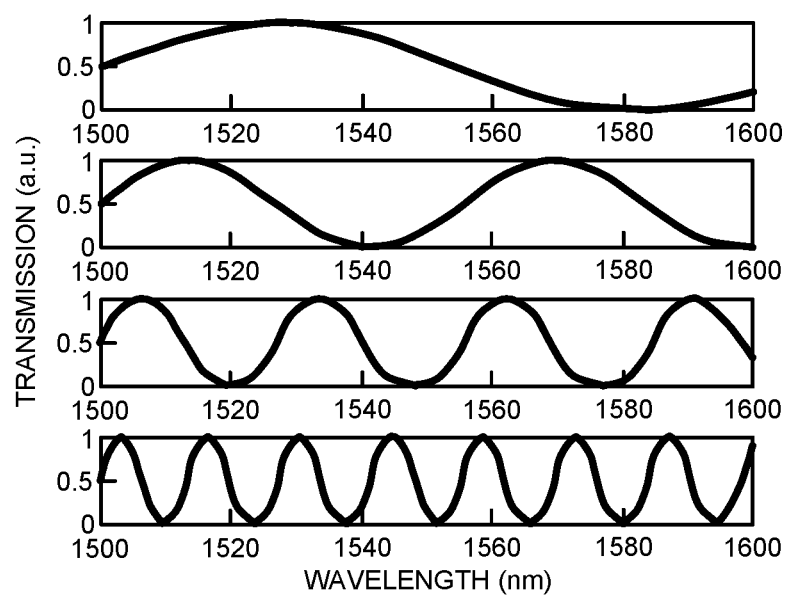
FIG. 5 is a drawing illustrating an example of variation of optical intensity with wavelength for a set of interferometers in the wavelength meter in FIG. 1 in accordance with an embodiment of the present disclosure.
Figure 6:
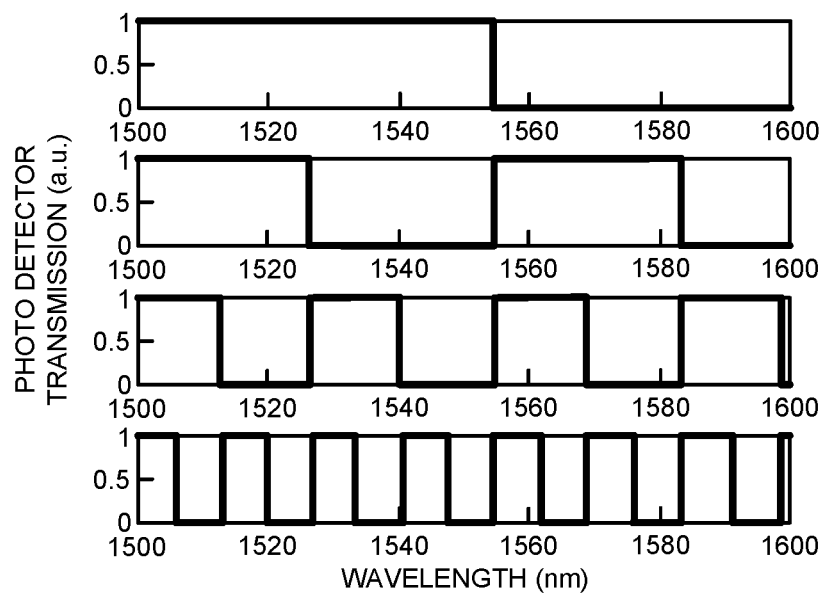
FIG. 6 is a drawing illustrating an example of digital electrical signals output by comparators in the wavelength meter in FIG. 1 in accordance with an embodiment of the present disclosure.

In these embodiments, the additional π/4 phase or delay may be implemented using an additional path delay or by another technique. For these embodiments, FIG. 5 presents a drawing illustrating an example of variation of optical intensity with wavelength for a set of interferometers 124 in wavelength meter 110 (FIG. 1), and FIG. 6 presents a drawing illustrating an example of digital electrical signals 142 output by comparators 140 in wavelength meter 110 (FIG. 1).

Figure 7:
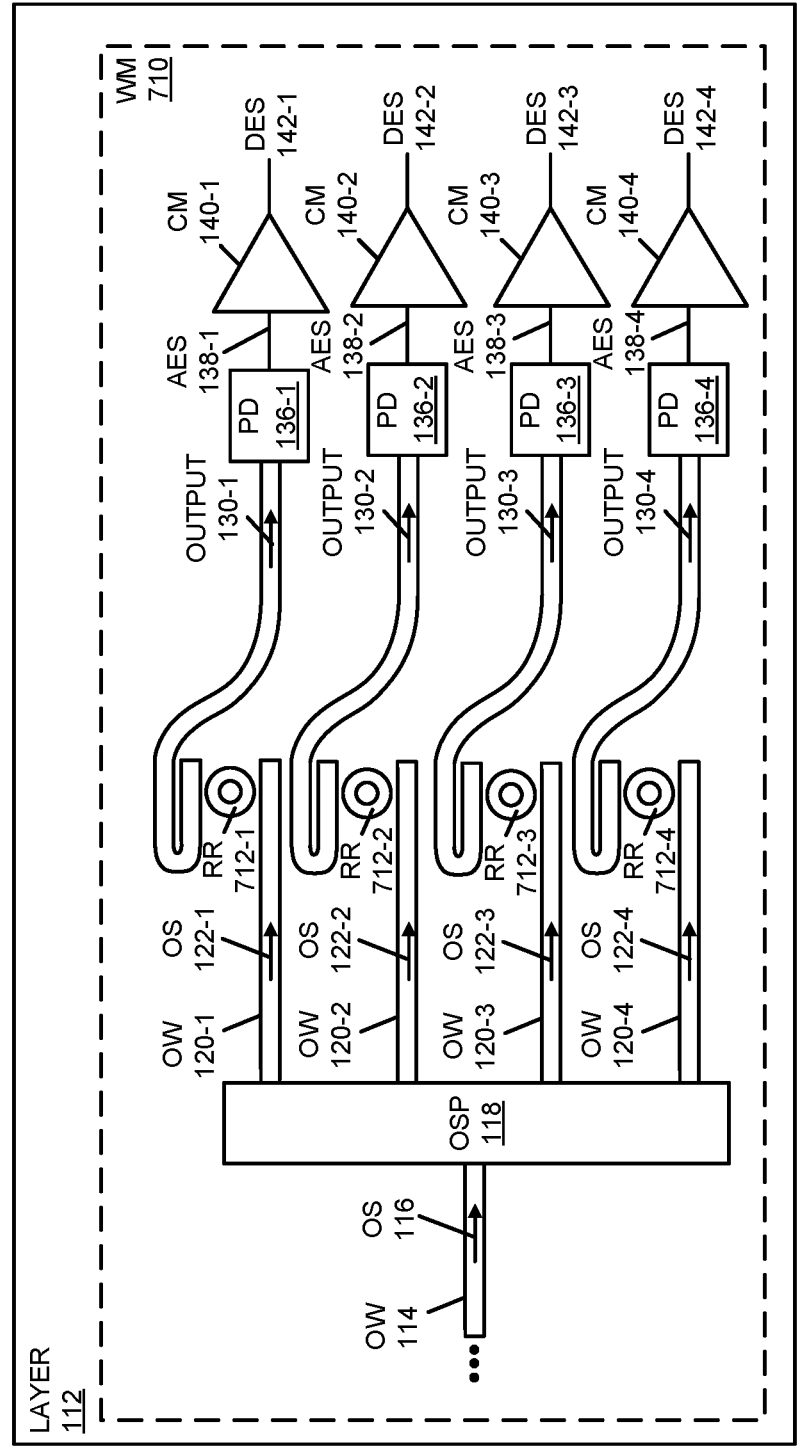
FIG. 7 is a block diagram illustrating an example of a top view of an integrated circuit that includes a wavelength meter in accordance with an embodiment of the present disclosure.

While the embodiments in the preceding discussion illustrated the measurement techniques using MZIs in the set of interferometers (which may be useful for wide and narrow-band measurements), in other embodiments the set of interferometers may be replaced with ring resonators, such as micro-ring resonators (which may be useful for small wavelength ranges, such as less than 10 nm). This is shown in FIG. 7, which presents a block diagram illustrating an example of a top view of an integrated circuit 700 that includes wavelength meter 710 and ring resonators (RR) 712. Note that these embodiments may be limited to a narrow spectral range.

Figure 8:
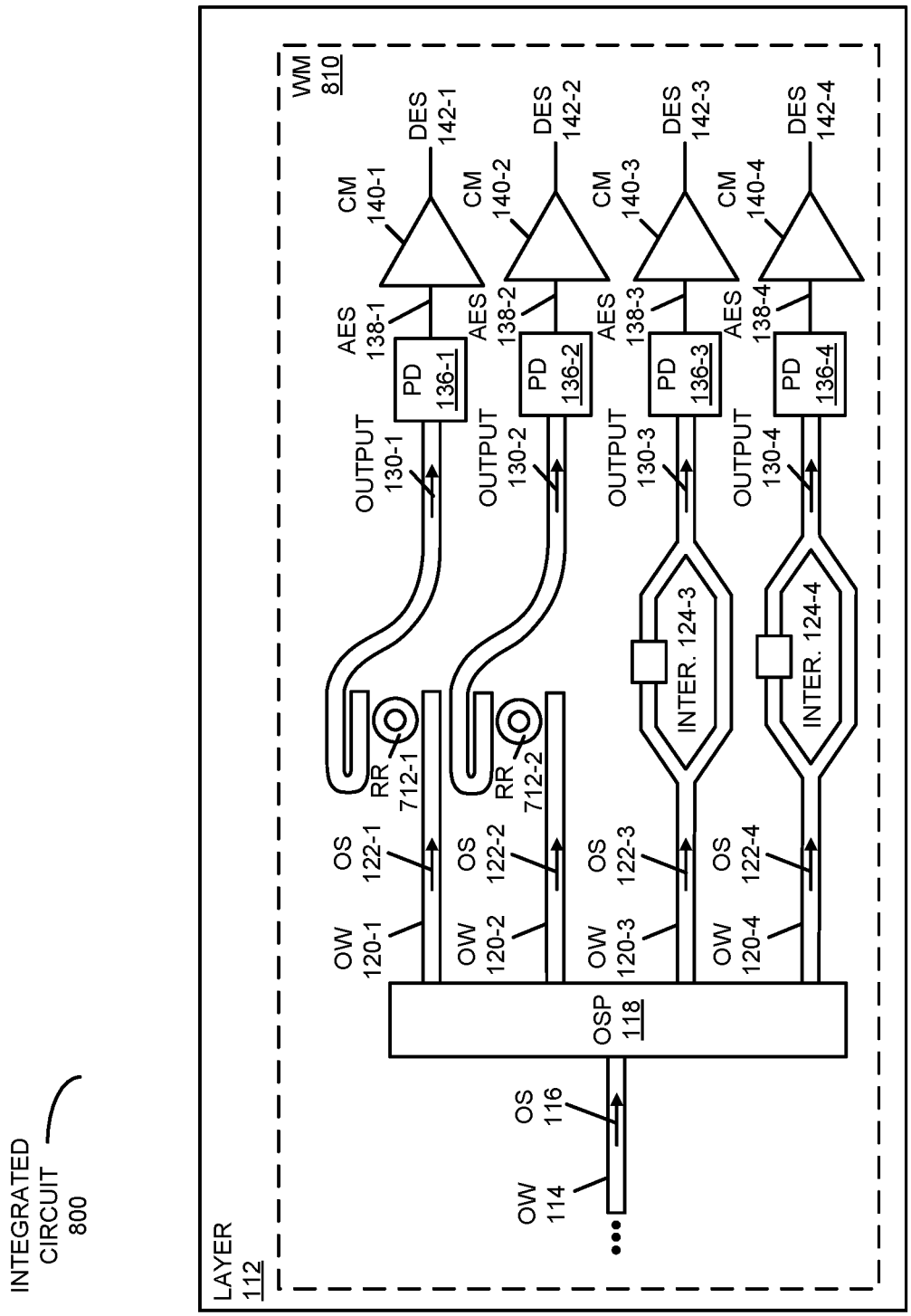
FIG. 8 is a block diagram illustrating an example of a top view of an integrated circuit that includes a wavelength meter in accordance with an embodiment of the present disclosure.

Alternatively, in some embodiments, the wavelength meters may include one or more MZIs and one or more ring resonators. This is shown in FIG. 8, which presents a block diagram illustrating an example of a top view of an integrated circuit 800 that includes a wavelength meter 810 with interferometers 124 and ring resonators 712. Note that the MZI may be used for the MSBs with larger FSRs and micro-ring resonators may be used for the LSBs with smaller FSRs and higher frequency response.

Figure 9:
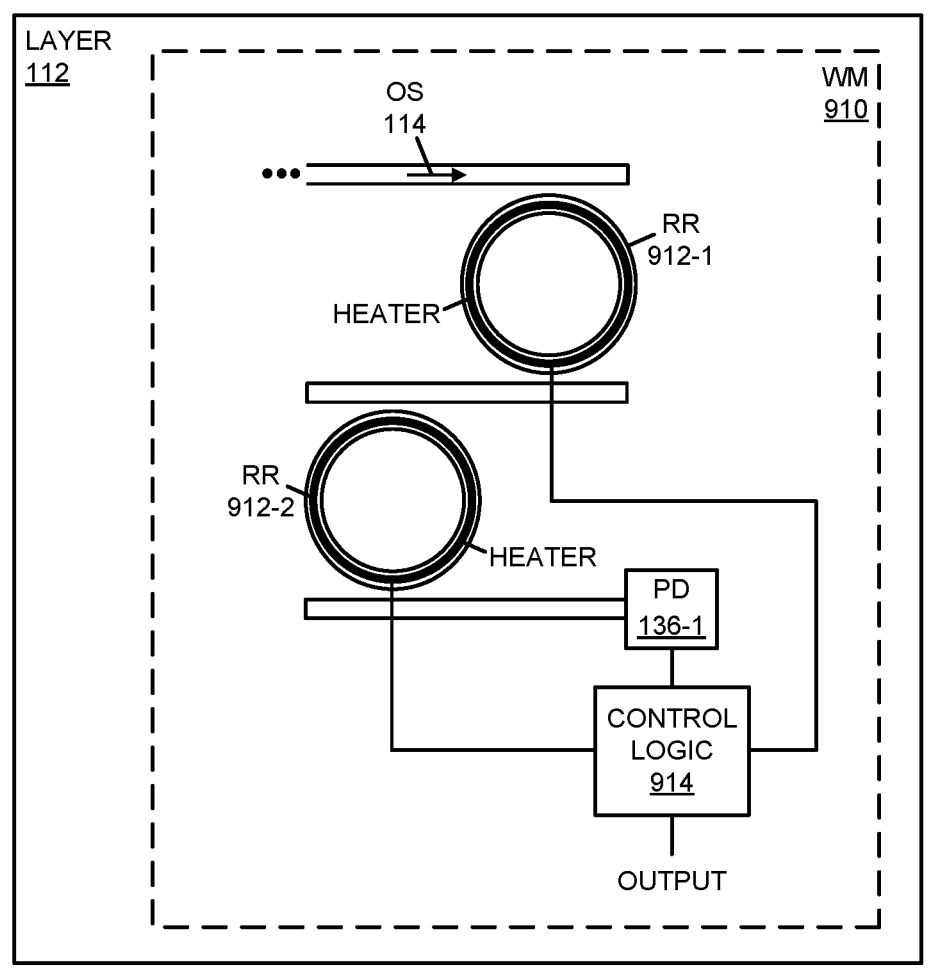
FIG. 9 is a block diagram illustrating an example of a top view of an integrated circuit that includes a wavelength meter in accordance with an embodiment of the present disclosure.

In some embodiments, the measurement techniques may be implemented using a successive-approximation on-chip opto-digital wavelength meter. For example, instead of the set of interferometers, the wavelength meter may include one or more ring resonators, such as a pair of ring resonators and/or a Vernier pair having an adjustable output wavelength. This is shown in FIG. 9, which presents a block diagram illustrating an example of a top view of an integrated circuit 900 that includes a wavelength meter 910. In FIG. 9, incoming light having a wavelength λ and optical power $P_{in}$ may enter a Vernier cavity made of two thermally tunable micro-ring resonators 912. Micro-ring resonator 912-1 and 912-2 may be designed as Vernier pair with a slightly difference in radius.

Wavelength meter 910 may exhibit the maximum transmission only when both micro-ring resonators 912 are aligned at the input wavelength λ. A control unit (such as control logic 914) may apply different values to the heaters for micro-rings resonators 912. The different heater values may move the transmission spectrum of each micro-ring resonator. At specific pairs of heater values, both transmission spectra of micro-ring resonators 912 may align around a wavelength, and otherwise they may be attenuating. The power measured by a photodetector 916 (such as a photodiode) may depend on the alignment of the peaks in the transmission spectra of micro-ring resonators 912. When micro-ring resonators 912 align at the input wavelength λ, photodetector 916 may measure high power. Otherwise, low power may be measured. The power of photodetector 916 may be detected (e.g., by a comparator 918) and provide to control logic 914. Control logic 914 may include a look-up table or function that includes or corresponds to supplied heater values (such as heater current values) and associated wavelengths. Moreover, control logic 914 may scan micro-ring resonators 912 and, when maximum power is detected, the input wavelength may be detected and provided as an output from wavelength meter 910.

Figure 10:
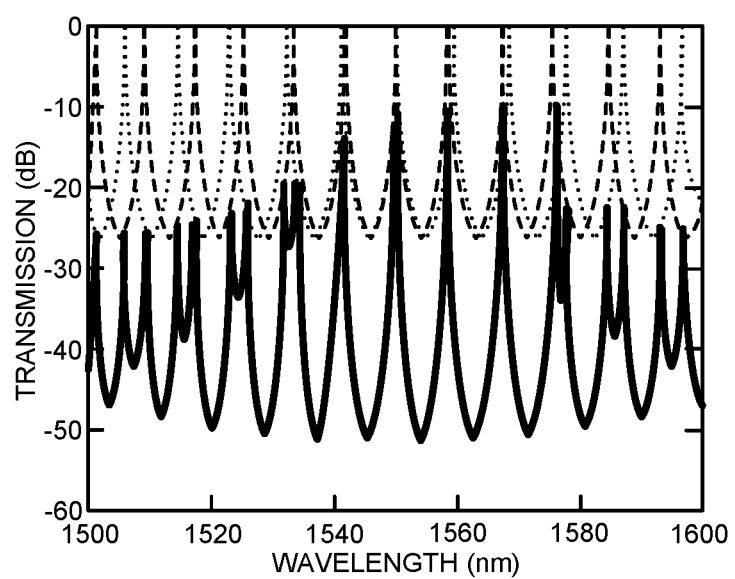
FIG. 10 is a drawing illustrating an example of operation of an embodiment of the wavelength meter in FIG. 9 in accordance with an embodiment of the present disclosure.
Figure 11:
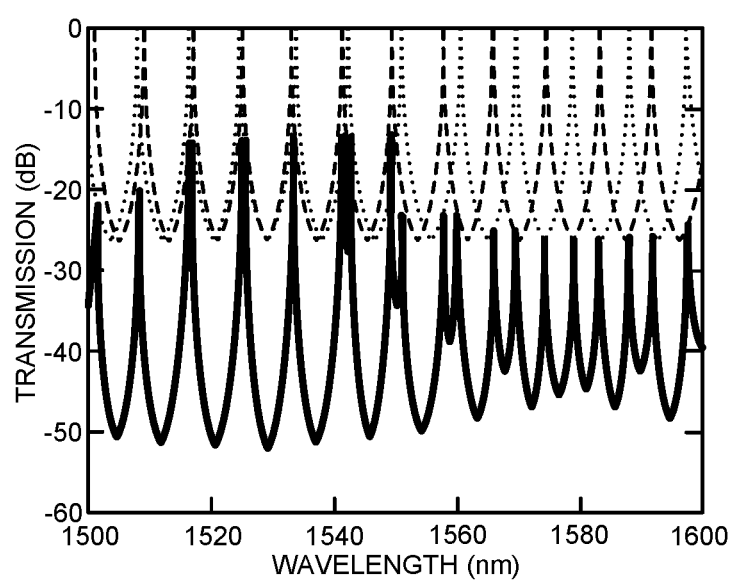
FIG. 11 is a drawing illustrating an example of operation of an embodiment of the wavelength meter in FIG. 9 in accordance with an embodiment of the present disclosure.

FIG. 10 presents a drawing illustrating an example of operation of an embodiment of wavelength meter 910 (FIG. 9). Notably, FIG. 10 illustrates the transmission of each micro-ring resonator (dashed line) and the total transmission (solid line). Micro-ring resonators 912 may be aligned only around 1550 nm. If a different current is provided to micro-ring resonators 912, the transmission spectra may move and micro-ring resonators 912 may realign, e.g., at 1525 nm. This is shown in FIG. 11, which present a drawing illustrating an example of operation of an embodiment of wavelength meter 910 (FIG. 9). The maximum power may be detected when micro-ring resonators 912 align at the input wavelength. At different wavelengths, the power may be low (because be there may not be light) and, when micro-ring resonators 912 are misaligned at the input wavelength, the power may be attenuated significantly.

Note that this Vernier-type wavelength meter may have a very low footprint or small size for the optical circuit. The disclosed wavelength meter may move the burden of complexity from the optical to electronic domain. Moreover, the accuracy of the detected wavelength may depend on the control provide by control logic 914 (and, in particular, the accuracy may be defined by the minimum step size of an analog scan that is performed by sweeping the narrowband filter provided by the Vernier pair over a range of wavelengths). Using high-resolution digital-to-analog circuits in control logic 914 may provide more-accurate wavelength readings.

Note that the preceding embodiments may include additional or fewer components. For example, FIG. 1 may include more or fewer interferometers and, thus, may have more or fewer bits of precision in the measurement of the wavelength. Moreover, positions of one or more components may be changed, two or more components may be combined into a single component and/or a component may be divided into two or more components.

Figure 12:
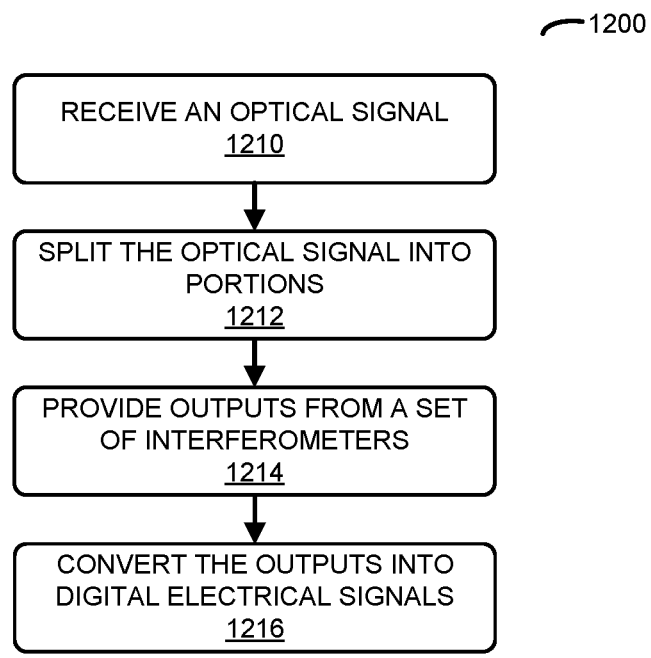
FIG. 12 is a flow diagram illustrating an example of a method for providing digital electrical signals that specify a range from a most-significant bit (MSB) to a least-significant bit (LSB) of a wavelength in an optical signal in accordance with an embodiment of the present disclosure.

We now describe embodiments of the method. FIG. 12 presents a flow chart illustrating an example of a method 1200 for providing digital electrical signals that specify a range from a MSB to a LSB of a wavelength in an optical signal, which may be performed by an embodiment of an integrated circuit, such as one of the integrated circuits in FIG. 1, 2, 7 or 8. During operation, the integrated circuit may receive an optical signal (operation 1210) comprising a wavelength. Then, the integrated circuit may split the optical signal into portions (operation 1212) that are provided to a set of interferometers in the wavelength meter, where the set of interferometers have integer multiples of a phase or a delay. Moreover, the integrated circuit may provide, from the set of interferometers, outputs (operation 1214) corresponding to the range. Next, the integrated circuit may convert the outputs into digital electrical signals (operation 1216) that specify the range from the MSB to the LSB.

In some embodiments of method 1200, there may be additional or fewer operations. Moreover, the order of the operations may be changed, and/or two or more operations may be combined into a single operation.

Figure 13:
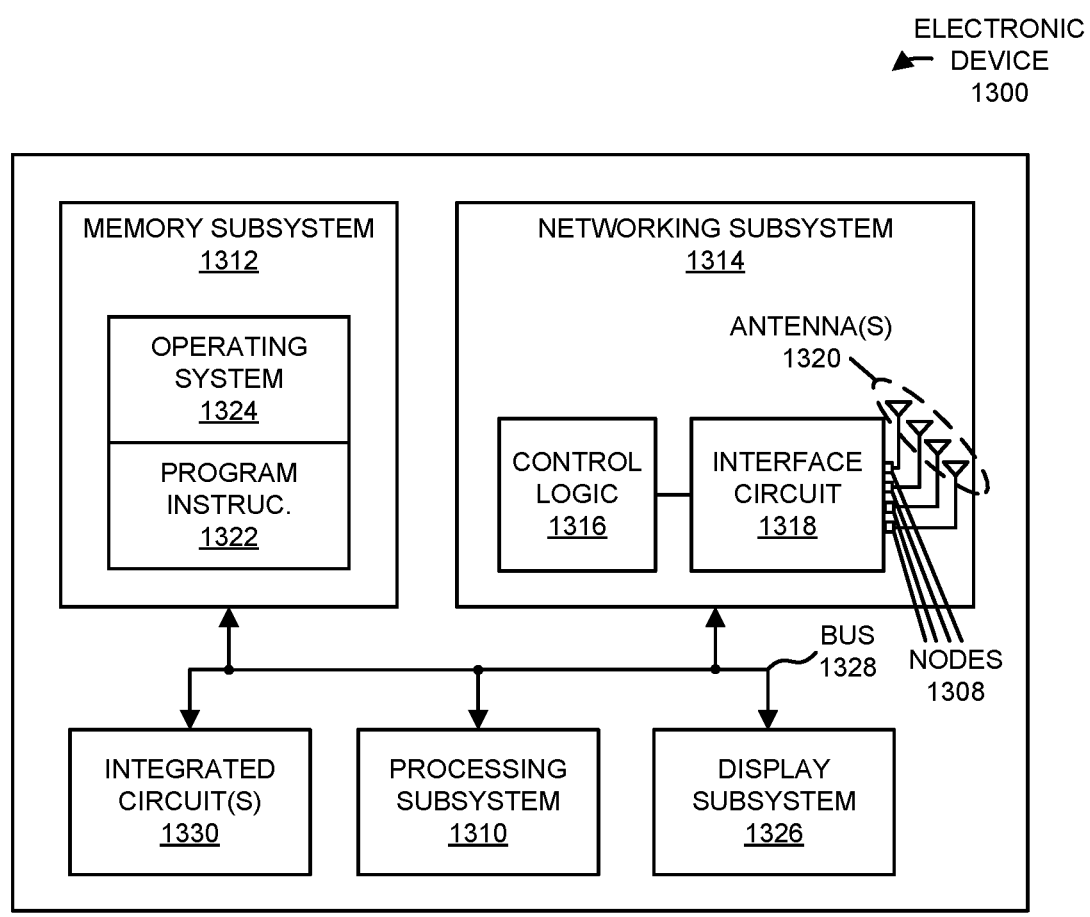
FIG. 13 is a block diagram illustrating an example of an electronic device that includes an integrated circuit in accordance with an embodiment of the present disclosure.

We now describe embodiments of an electronic device, which may perform at least some of the operations in the measurement techniques. FIG. 13 presents a block diagram illustrating an example of an electronic device 1300 (or one or more electronic devices). This electronic device includes processing subsystem 1310, memory subsystem 1312, and networking subsystem 1314. Note that one or more of these subsystems may include at least an instance of one of the previous embodiments of the integrated circuit in FIG. 1, 2, 7, 8 or 9.

Processing subsystem 1310 includes one or more devices configured to perform computational operations. For example, processing subsystem 1310 can include one or more: microprocessors, ASICs, microcontrollers, programmable-logic devices, graphics processing units (GPUs) and/or digital signal processors (DSPs).

Memory subsystem 1312 includes one or more devices for storing data and/or instructions for processing subsystem 1310 and networking subsystem 1314. For example, memory subsystem 1312 can include dynamic random access memory (DRAM), static random access memory (SRAM), and/or other types of memory. In some embodiments, instructions for processing subsystem 1310 in memory subsystem 1312 include: one or more program instructions or sets of instructions (such as program instructions 1322 or operating system 1324), which may be executed by processing subsystem 1310. Note that the one or more computer programs may constitute a computer-program mechanism. Moreover, instructions in the various modules in memory subsystem 1312 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1310.

In addition, memory subsystem 1312 can include mechanisms (such as a circuit or software) for controlling access to the memory. In some embodiments, memory subsystem 1312 includes a memory hierarchy that comprises one or more caches coupled to a memory in electronic device 1300. In some of these embodiments, one or more of the caches is located in processing subsystem 1310.

In some embodiments, memory subsystem 1312 is coupled to one or more high-capacity mass-storage devices (not shown). For example, memory subsystem 1312 can be coupled to a magnetic or optical drive, a solid-state drive, or another type of mass-storage device. In these embodiments, memory subsystem 1312 can be used by electronic device 1300 as fast-access storage for often-used data, while the mass-storage device is used to store less frequently used data.

Networking subsystem 1314 includes one or more devices configured to couple to and communicate on a wired and/or wireless network (i.e., to perform network operations), including: control logic 1316, an interface circuit 1318 and one or more optional antennas 1320 (or antenna elements). (While FIG. 13 includes one or more antennas 1320, in some embodiments electronic device 1300 includes one or more nodes, such as nodes 1308, e.g., a connector or a pad, which can be coupled to the one or more antennas 1320. Thus, electronic device 1300 may or may not include the one or more antennas 1320.) For example, networking subsystem 1314 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 1314 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1300 may use networking subsystem 1314 for performing simple wireless communication, e.g., transmitting advertising or beacon frames and/or scanning for advertising frames transmitted by other electronic devices.

Within electronic device 1300, processing subsystem 1310, memory subsystem 1312, networking subsystem 1314 and optional integrated circuit(s) 1330 are coupled together using signal lines, links or bus 1328. These connections may include an electrical, optical, and/or electro-optical connection that the subsystems can use to communicate signals, commands and data among one another.

Furthermore, while some components are shown directly connected to one another in FIG. 13, in general coupling can also occur via intermediate components. In each instance, the method of interconnection, or 'coupling,' establishes some desired communication between two or more circuit nodes, or terminals. Such coupling may often be accomplished using a number of circuit configurations, as will be understood by those of skill in the art; for example, AC coupling and/or DC coupling may be used. Although only one bus 1328 (or one or more signal lines) is shown for clarity in FIG. 13, different embodiments can include a different number or configuration of electrical, optical, and/or electro-optical connections among the subsystems.

In some embodiments, electronic device 1300 includes a display subsystem 1326 for displaying information on a display, which may include a display driver and the display, such as a liquid-crystal display, a multi-touch touchscreen, etc.

Electronic device 1300 and/or an instance of the integrated circuit may include: a VLSI circuit, a switch, a hub, a bridge, a router, a communication system (such as a wavelength-division-multiplexing communication system), a storage area network, a data center, a network (such as a local area network), and/or a computer system (such as a multiple-core processor computer system). Furthermore, the computer system and/or an instance of the integrated circuit may include, but is not limited to: a desktop computer, a server (such as a multi-socket, multi-rack server), a laptop computer, a communication device or system, an access point, a router, a switch, communication equipment, a controller, test equipment, a personal computer, a work station, a mainframe computer, a blade, an enterprise computer, a data center, a tablet computer, a supercomputer, a network-attached-storage (NAS) system, a storage-area-network (SAN) system, a media player, an appliance, a subnotebook/netbook, a tablet computer, a smartphone, a cellular telephone, a smartwatch, a network appliance, a set-top box, a personal digital assistant (PDA), a toy, a controller, a digital signal processor, a game console, a device controller, a computational engine within an appliance, a consumer-electronic device, a portable computing device or a portable electronic device, a personal organizer, a sensor (such as a LIDAR sensor), an automobile or a truck, another electronic device, a laser (such as a hybrid laser) and/or another optical component.

Although specific components are used to describe electronic device 1300, in alternative embodiments, different components and/or subsystems may be present in electronic device 1300. For example, electronic device 1300 may include one or more additional processing subsystems, memory subsystems, networking subsystems, display subsystems and/or one or more additional subsystems not shown in FIG. 13 (such as a user-input subsystem). Additionally, one or more of the subsystems may not be present in electronic device 1300. Also, although separate subsystems are shown in FIG. 13, in some embodiments some or all of a given subsystem or component can be moved or integrated into one or more of the other subsystems or component(s) in electronic device 1300. For example, in some embodiments program instructions 1322 are included in operating system 1324 and/or control logic 1316 is included in interface circuit 1318. Thus, while electronic device 1300, as well as the previous embodiments of the integrated circuit, are illustrated as having a number of discrete items, these components are intended to be functional descriptions of the various features that may be present rather than structural schematics of the embodiments described herein.

Moreover, the circuits and components in electronic device 1300 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of electronic device 1300. In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While some of the operations in the preceding embodiments were implemented in hardware or software, in general the operations in the preceding embodiments can be implemented in a wide variety of configurations and architectures, such as by one or more: ASICs, FPGAs, DPSs, GPUs, etc. Therefore, some or all of the operations in the preceding embodiments may be performed in hardware, in software or both. For example, at least some of the operations in the measurement techniques may be implemented using program instructions 1322, operating system 1324 (such as a driver for interface circuit 1318) or in firmware in interface circuit 1318. Alternatively or additionally, at least some of the operations in the measurement techniques may be implemented in a physical layer, such as hardware in interface circuit 1318. In general, electronic device 1300 may be at one location or may be distributed over multiple, geographically dispersed locations.

Moreover, the preceding embodiments of the integrated circuit and/or electronic device 1300 can be used in a wide variety of applications, such as: communications (for example, in a transceiver, an optical source (such as a laser), an optical interconnect or an optical link, such as for intra-chip or inter-chip communication), a radio-frequency filter, a bio-sensor, data storage (such as an optical-storage device or system), medicine (such as a diagnostic technique or surgery), a barcode scanner, metrology (such as precision measurements of distance), manufacturing (cutting or welding), a lithographic process, data storage (such as an optical-storage device or system) and/or entertainment (a laser light show).

While the preceding embodiments have been illustrated with particular elements and compounds, a wide variety of materials and compositions (including stoichiometric and non-stoichiometric compositions) may be used, as is known to one of skill in the art. Thus, while a silicon optical waveguide was illustrated in some of the preceding embodiments, the measurement techniques may be used with other materials (such as germanium and/or silicon germanium), as is known to one of skill in the art. Moreover, the layer may include polysilicon or amorphous silicon. Furthermore, the materials and compounds in the embodiments of the integrated circuit may be fabricated using a wide variety of processing techniques, including: evaporation, sputtering, chemical vapor deposition, molecular-beam epitaxy, wet or dry etching (such as photolithography or direct-write lithography), polishing, etc. In addition, a wide variety of optical components may be used in or in conjunction with one or more of the embodiments of the integrated circuit. Furthermore, a wide variety of optical sources may be integrated with or included in one or more of the embodiments of the integrated circuit, including many different types of lasers or non-laser optical sources (such as a light-emitting diode).

Note that the use of the phrases 'capable of,' 'capable to,' 'operable to,' or 'configured to' in one or more embodiments, refers to some apparatus, logic, hardware, and/or element designed in such a way to enable use of the apparatus, logic, hardware, and/or element in a specified manner.

Moreover, while the preceding discussion included some numerical values, these values are for purposes of illustration and are not intended to be limiting. In other embodiments, different numerical values may be used.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An integrated circuit, comprising a wavelength meter, wherein the wavelength meter comprises:
    a set of interferometers having integer multiples of a phase or a delay, wherein the set of interferometers configured to provide outputs corresponding to a range from a most-significant bit (MSB) to a least-significant bit (LSB) of a wavelength in an optical signal, wherein the set of interferometers are non-tunable, wherein the range is predefined and a given interferometer in the set of interferometers is configured to perform binary detection in predefined subset of the range, and wherein at least some interferometers in the set of interferometers comprise ring resonators having free spectral ranges (FSRs) corresponding to the predefined subsets of the range; and
    a converter, optically coupled to the set of interferometers, configured to provide digital electrical signals that specify the range from the MSB to the LSB.

2. The integrated circuit of claim 1, wherein the set of interferometers comprise Mach Zehnder interferometers (MZIs).

3. The integrated circuit of claim 1, wherein the set of interferometers are configured to provide the outputs using a parallel implementation of binary quantization.

4. The integrated circuit of claim 1, wherein the converter comprises:
    one or more photodetectors, optically coupled to the set of interferometers, configured to provide analog electrical signals corresponding to the outputs; and
    one or more comparators, electrically coupled to the one or more photodetectors, configured to provide the digital electrical signals corresponding to the analog electrical signals.

5. The integrated circuit of claim 1, wherein the set of interferometers have different free spectral ranges (FSRs);
    wherein an interferometer configured to provide an output corresponding to the MSB has a largest FSR and a smallest phase or delay, and a second interferometer configured to provide a second output corresponding to the LSB has a smallest FSR and a largest phase or delay; and
    wherein a range of the wavelength meter is specified by the largest FSR and a precision of the wavelength meter is specified by the smallest FSR.

6. The integrated circuit of claim 1, wherein an interferometer in the set of interferometers has a periodic spectrum having a period, and the period is an even integer multiple of a second period of a second interferometer in the set of interferometers.

7. The integrated circuit of claim 1, wherein the integrated circuit comprises an optical splitter, optically coupled to the set of interferometers, configured to provide portions of the optical signal to the set of interferometers.

8. The integrated circuit of claim 1, wherein the set of interferometers comprises a pair of ring resonators; and
    wherein the pair of ring resonators comprises a Vernier pair having an adjustable output wavelength.

9. The integrated circuit of claim 1, wherein the set of interferometers comprises a Mach Zehnder interferometer (MZI) having the phase or the delay in an arm of the MZI.

10. An electronic device, comprising:
    a wavelength meter, wherein the wavelength meter comprises:
        a set of interferometers having integer multiples of a phase or a delay, wherein the set of interferometers configured to provide outputs corresponding to a range from a most-significant bit (MSB) to a least-significant bit (LSB) of a wavelength in an optical signal, wherein the set of interferometers are non-tunable, wherein the range is predefined and a given interferometer in the set of interferometers is configured to perform binary detection in predefined subset of the range, and wherein at least some interferometers in the set of interferometers comprise ring resonators having free spectral ranges (FSRs) corresponding to the predefined subsets of the range; and a converter, optically coupled to the set of interferometers, configured to provide digital electrical signals that specify the range from the MSB to the LSB.

11. The electronic device of claim 10, wherein the set of interferometers comprise Mach Zehnder interferometers (MZIs).

12. The electronic device of claim 10, wherein the set of interferometers are configured to provide the outputs using a parallel implementation of binary quantization.

13. The electronic device of claim 10, wherein the converter comprises:
one or more photodetectors, optically coupled to the set of interferometers, configured to provide analog electrical signals corresponding to the outputs; and
one or more comparators, electrically coupled to the one or more photodetectors, configured to provide the digital electrical signals corresponding to the analog electrical signals.

14. The electronic device of claim 10, wherein the set of interferometers have different free spectral ranges (FSRs);
wherein an interferometer in the set of interferometers configured to provide an output corresponding to the MSB has a largest FSR and a smallest phase or delay, and a second interferometer in the set of interferometers configured to provide a second output corresponding to the LSB has a smallest FSR and a largest phase or delay; and
wherein a range of the wavelength meter is specified by the largest FSR and a precision of the wavelength meter is specified by the smallest FSR.

15. The electronic device of claim 10, wherein an interferometer in the set of interferometers has a periodic spectrum having a period, and the period is an even integer multiple of a second period of a second interferometer in the set of interferometers.

16. The electronic device of claim 10, wherein the integrated circuit comprises an optical splitter, optically coupled to the set of interferometers, configured to provide portions of the optical signal to the set of interferometers.

17. The electronic device of claim 10, wherein the set of interferometers comprises a pair of ring resonators; and wherein the pair of ring resonators comprises a Vernier pair having an adjustable output wavelength.

18. The electronic device of claim 10, wherein the set of interferometers comprises a Mach Zehnder interferometer (MZI) having the phase or the delay in an arm of the MZI.

19. A method for providing digital electrical signals that specify a range from a most-significant bit (MSB) to a least-significant bit (LSB) of a wavelength in an optical signal, comprising:
by an integrated circuit comprising a wavelength meter:
receiving an optical signal comprising a wavelength;
splitting the optical signal into portions that are provided to a set of interferometers in the wavelength meter, wherein the set of interferometers have integer multiples of a phase or a delay, wherein the set of interferometers are non-tunable, wherein the range is predefined and a given interferometer in the set of interferometers is configured to perform binary detection in predefined subset of the range, and wherein at least some interferometers in the set of interferometers comprise ring resonators having free spectral ranges (FSRs) corresponding to the predefined subsets of the range;
providing, from the set of interferometers, outputs corresponding to the range; and
converting the outputs into digital electrical signals that specify the range from the MSB to the LSB.

20. The method of claim 19, wherein the set of interferometers have different free spectral ranges (FSRs);
wherein an interferometer in the set of interferometers provides an output corresponding to the MSB has a largest FSR and a smallest phase or delay, and a second interferometer in the set of interferometers provides a second output corresponding to the LSB has a smallest FSR and a largest phase or delay; and
wherein a range of the wavelength meter is specified by the largest FSR and a precision of the wavelength meter is specified by the smallest FSR.

21. The integrated circuit of claim 1, wherein the integrated circuit excludes an analog-to-digital converter.

* * * * *